United States Patent [19]

Sottosanti et al.

[11] 4,108,381
[45] Aug. 22, 1978

[54] ROCKET NOZZLE BEARING SEAL

[75] Inventors: Philip C. Sottosanti, Ogden, Utah; William H. Baker, Orangevale, Calif.; William T. Dolling, Brigham City, Utah

[73] Assignee: Thiokol Corporation, Newtown, Pa.

[21] Appl. No.: 803,487

[22] Filed: Jun. 6, 1977

[51] Int. Cl.² ............................................. B64C 15/04
[52] U.S. Cl. ................................................ 239/265.35
[58] Field of Search .................... 308/72; 239/265.11, 239/265.35

[56] References Cited

U.S. PATENT DOCUMENTS

| 3,361,362 | 1/1968 | Edwards | 239/265.35 |
| 3,698,192 | 10/1972 | LeFebure, Jr. | 239/265.35 |
| 3,912,172 | 10/1975 | Bolner | 239/265.35 |

Primary Examiner—John J. Love

Attorney, Agent, or Firm—Stanley A. Marcus; Edward E. McCullough

[57] ABSTRACT

The invention is a special, low-friction, compliant bearing seal for use between the stationary and movable members of a thrust-vectoring, rocket nozzle. The movable member of such nozzles typically contains the throat and expansion cone for acceleration of the propulsive gases. It is attached to the back end of the rocket by the stationary member. A torsion ring, seated in an annular groove in the stationary member of the nozzle holds an annular, lubricous pad against a spherical surface of the movable member. An elastomeric pad bonded between the adjacent surfaces of the torsion ring and the groove, both of which are arcuate in cross section, permits twisting motion of the torsion ring; so that the lubricous pad maintains its seal and bearing function relative to the movable member, despite temporary deformations of the nozzle members during operation of the rocket.

8 Claims, 2 Drawing Figures

ROCKET NOZZLE BEARING SEAL

CROSS-REFERENCE TO RELATED APPLICATIONS

This application is related to application Ser. No. 654,320, by Fred B. Buche et al, titled "Low-Friction, Movable, Rocket Nozzle," filed Feb. 2, 1976 now abandoned.

BACKGROUND OF THE INVENTION

This invention relates broadly to low-friction, movable, rocket nozzles. More specifically, it relates to such nozzles having a compliant bearing seal that remains effective despite temporary deformations of the nozzle members. The invention herein described was made in the course of or under Contract No. F04611-75-C-0063 with the U.S. Air Force.

Movable thrust nozzles have proved to be the most successful means for steering rockets. However, considerable difficulty has been presented by the fact that such nozzles must incorporate gastight seals capable of containing flaming, erosive gases under very high pressures and still be movable by light weight equipment over a practical deflection angle.

Spherical, metal-to-metal surfaces have been used for joining the parts of movable rocket nozzles, sometimes supported by gimbal mechanisms and sealed together with elastomeric rings. Such nozzles require high precision, and sometimes galling between the metal surfaces becomes a problem. More recently, elastomeric bearings made of laminae of metal and elastomer alternately stacked and bonded together have been used to support the movable portion of the nozzle relative to the portion that is fixed to the rocket. Such bearings have been successful in effecting gastight seals while providing the capability of relative motion. However, considerable torque is necessary to deflect the movable member of the rocket. Moreover, elastomeric bearings possess some of the properties of springs and resist being moved out of their neutral positions. This resistance is roughly proportional to the deflection angle, so that increasing force is required to move the nozzle as the deflection angle increases.

The present invention, which overcomes some of these difficulties of the prior art nozzles, is essentially a thrust-vectoring, rocket nozzle having an annular, lubricous, bearing pad between the bearing surfaces of the movable and stationary members, that functions also as a gastight seal. It is bonded to the fixed member of the nozzle via a torsion ring and elastomeric pad. This not only permits a wide angle of deflection of the movable nozzle member, but also provides a low friction system that offers little resistance to actuators, so that the actuators also may be smaller and less powerful. Hence, the entire system saves considerable weight that may be used more profitably to increase the payload and/or range of the rocket. At the same time, the lowered friction promotes faster responsiveness.

The bearing pad is made of woven fibers of lubricous material, that may be reinforced on the side bonded to the torsion ring by weaving refractory, high tensile strength fibers into those of the lubricous material or by bonding a thin sheet of refractory material to one side of the pad. Interstices between the fibers of lubricous material are filled with the same material or with other resinous material, so that it forms a gastight seal.

The present invention provides an improvement over that of the related application cited above. That application describes an annular pad of lubricous material rigidly fixed to either the ball or socket portion of ball-and-socket type of movable rocket nozzle. This pad functioned, as does that of the present invention, for the simultaneous, dual purpose of providing a low-friction bearing and a gastight seal capable of containing the hot, propulsive gases of the rocket.

A difficulty with the prior invention, however, is that, since the bearing pad is thin and is bonded directly to a nozzle part, considerable precision is necessary in manufacture of the parts in order for the bearing pad to function also as a hot gas seal. Such dimensional precision increases the cost of the nozzle. Hence, it is desirable that the dimensional tolerances be less limited.

SUMMARY OF THE INVENTION

The present invention solves this problem by providing torsional compliance for the lubricous pad, relative to the nozzle members, so that it always conforms to the surface of the member against which it bears and so that the dimensional tolerances of the nozzle parts can be greater. This is accomplished by bonding the annular, lubricous pad to a torsion ring that is arcuate in cross section and is seated in an arcuate groove, with an elastomeric pad bonded between the torsion ring and its groove. With this arrangement, the torsion ring is free to twist about a circle of torsional rotation, defined by the contour of the groove, within the elastic limits of the elastomer.

The lubricous pad is made of low friction fibers woven into a cloth and bonded to the torsion ring with an adhesive. Bonding the torsion ring to adjacent parts is preferably effected by inserting an uncured elastomer between the torsion ring and its groove. The assembly is brought to a temperature at which fluidity of the elastomer is greatest, and then pressure is added until the elastomer is cured.

Objects of the invention are to provide a low-friction bearing seal, for use between the main parts of a thrust-vectoring nozzle for rockets, that will form a gastight seal to contain the hot, erosive propulsive gases thereof, and provide a low-friction bearing. Another object is to provide such a bearing seal that has sufficient torsional compliance to maintain a gastight seal despite small, temporary deformations of the nozzle parts. Another object of the invention is to increase the manufacturing tolerances of the nozzle parts. Important features of the invention are that it is inexpensive and easy to manufacture.

Other objects and features of the invention will become apparent as the following, detailed description is read, with reference to the accompanying drawings. The same parts are designated with the same numbers throughout the disclosure.

DESCRIPTION OF THE PREFERRED EMBODIMENTS

Figure 1:
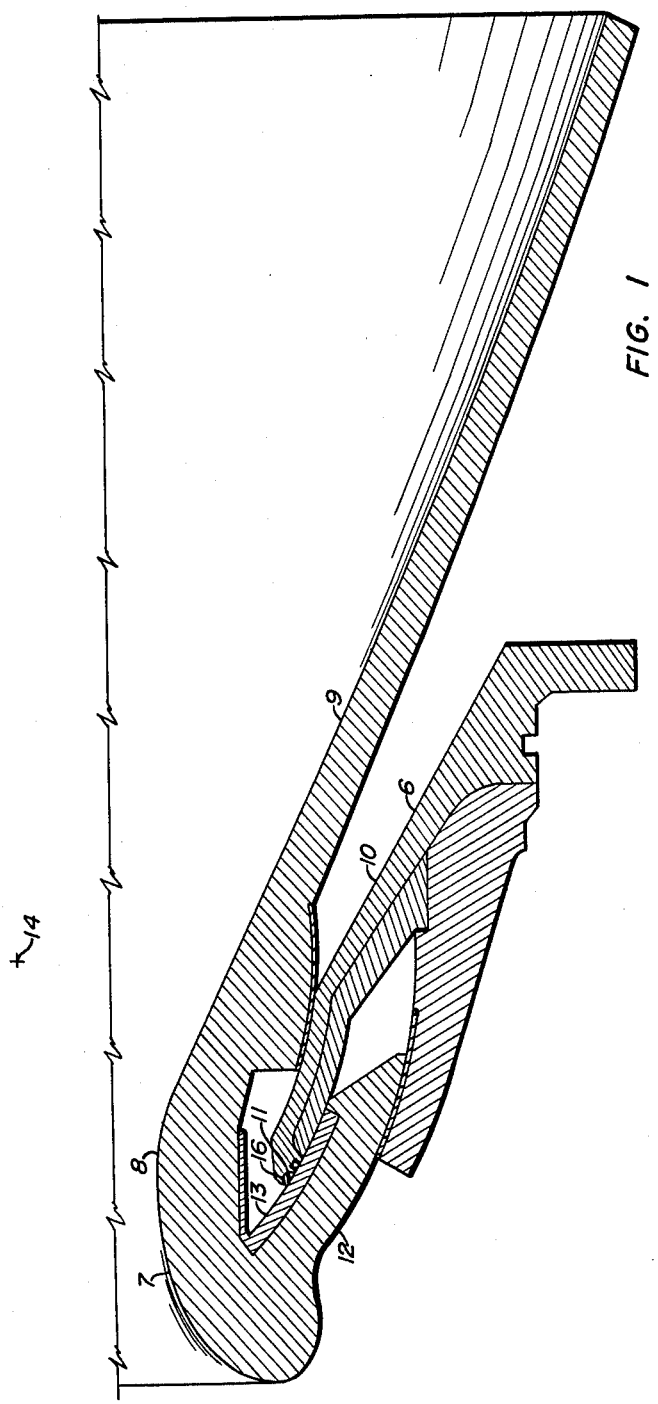
FIG. 1 is a partial, longitudinal section of the invention.
Figure 2:
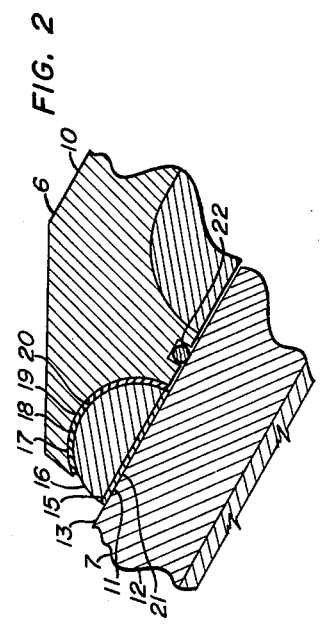
FIG. 2 is an enlarged detail view of the portion of FIG. 1 that shows the bearing seal of the invention.

As shown in FIG. 1, one type of thrust nozzle for rockets is essentially a universal joint, wherein a stationary member 6 is fixed to the aft end of a rocket case and the movable member 7 is attached to the stationary member 6 for omniaxial rotation within the limits of an imaginary cone about the axis of the rocket. This movable member 7 is of the convergent-divergent type that includes a throat 8 and an expansion cone 9 for acceleration of the propulsive gases of the rocket.

In the nozzle design shown in FIG. 1, the stationary member 6 is essentially a truncated, conical flange 10, the larger end of which is to be fastened to the aft dome aperture of a rocket (not shown) and the smaller end of which extends inwardly relative to the rocket, defining a smaller aperture and having a bearing surface 11 on the outside edge thereof. The movable member 7 is typically partially submerged, as shown, and is equipped with a special, bearing and insulating flange 12, fixed to the member 7 near the forward portion thereof and extending aftwardly. The inner surface 13 of the bearing flange 12 is spherical about a point 14 of rotation, around which the movable member 7 may rotate.

The annular, lubricous bearing pad 15 of the invention is bonded to the torsion ring 16, seated in an annular groove 17 in the bearing surface 11 of the conical flange 10 so that it bears against the inner, spherical surface 13 of the bearing flange 12. An elastomeric pad 18, bonded between the torsion ring 16 and the groove 17, permits twisting motion of the torsion ring 16.

Thrust nozzles are typically subjected to two opposing, axial forces in an operating rocket. The "blowout" load, imposed on the movable nozzle member 7 by the internal or chamber pressure of the propulsive gases, tends to force it outwardly; while the expanding gases, acting on the expansion surface of the exit cone 9, tends to force the nozzle member 7 inwardly. Typically, the blowout load is by far the greater force. This is borne by the bearing pad 15 against the spherical surface 13.

The cross-sectional configuration of the groove 17 is arcuate, as is the inner surface of the torsion ring 16. Both surfaces are concentric about a center of torsional rotation, which is a circle. An elastomeric pad 18, bonded between the groove 17 and the torsion ring 16, serves the dual purposes of permitting the torsion ring 16 to rotate and of providing a gastight seal between it and the groove 17. Since the arcuate surfaces 19 and 20, respectively, of the groove 17 and the torsion ring 16 are concentric, the radius of that 20 of the torsion ring 16 is less than that 19 of the groove 16 by the thickness of the elastomeric pad 18. If the rocket nozzle is very large, the outer surface 21 of the bearing pad 15 should conform to the spherical surface 13 of the bearing flange 12. However, for most applications, this surface 21 may be flat.

The bearing pad 15 is preferably made of woven fibers of polytetrafluoroethylene (Teflon), arranged in an annular mold, together with the torsion ring 16 and a ring of fluorinated ethylene-propylene (FEP Teflon). Application of heat and pressure then melts the FEP, impregnating the Teflon fibers therewith and bonding them to the torsion ring 16. Alternatively, the Teflon fibers may be reinforced, and their bondability enhanced, by weaving refractory fibers, as of glass or carbon, into one side of the pad 15. This side is then bonded to the torsion ring 16 with a phenolic adhesive under heat and pressure in a mold. Bonding of the pad 15 to the torsion ring 16 may be enhanced by previously grit blasting the surface of the torsion ring 16.

A natural, uncured, rubber formulation is then prepared and tested for the desired viscosity and shear modulus. A typical, preferred formulation is, in parts by weight:

| | |
|---|---|
| Raw latex | 100 |
| Carbon black | 30 |
| Zinc oxide | 5 |
| Sulfur | 0.6 |
| Zinc 2-Ethyl hexanoate | 2 |
| 2-Morpholinothio benzothiazole | 1.44 |
| Tetrabutylthiuram disulphide | 0.6 |
| Poly-2,2,4-trimethyl 1-1,2-dihydroquinoline | 2 |

The latex is Standard Malaysian Rubber Grade No. 5. The tetrabutylthiuram disulfide is available under the trade name, "Butyl Tuads," from the R. T. Vanderbilt Company of Los Angeles, California. The 2-morpholinothio benzothiazole is sold under the trade name, "Santocure MOR" from the Monsanto Company of St. Louis, Missouri. The poly-2,2,4-trimethyl 1-1,2-dihydroquinoline is available under the trade name, "Flectol H." also from Monsanto Company of St. Louis, Missouri. All ingredients are mixed together and thoroughly blended in a mechanical mixer.

If the nozzle is large, this composition is then partially cured, calendered to the appropriate thickness, cut into long strips of desired width, and arranged in the groove 17. If the nozzle is small, the uncured elastomer is simply applied to the groove surface 19. The torsion ring 16 is then pressed into place on top of the rubber, and the entire assembly is raised to about 250° F until cure of the rubber is completed. Bonding agents may be used at the interfaces of the rubber pad 18 and the groove 17, and of the rubber pad 18 and the torsion ring 16, if desired. If the rocket nozzle is too large to be conveniently heated or placed in an oven, the elastomer 18 is completely cured before assembly, and bonding agents are used.

A number of rubber compositions, both natural and synthetic, have been found to have the properties required for this invention. They are of the types used in elastomeric bearings, and are well known in the art. Also lubricous resins other than those described above, may be used for construction of the bearing pad 15, such as succinonitrile and "Kevlar," an aromatic polyamide made and sold by the E. I. DuPont de Nemours Company.

To protect the bearing pad 15 from direct impingement of the high-temperature, propulsive gases, an elastomeric seal ring 22, seated in an annular groove in the bearing surface 11 of the flange 10, is provided adjacent the bearing pad 15.

An invention has been described that provides an advance in the art of rocket thrust nozzles. Although the embodiments have been described specifically with regard to detail, it should be noted that many details may be altered without departing from the scope of the invention, as it is defined in the following claims.

The invention claimed is:

1. In a thrust vectoring, convergent-divergent, nozzle for rockets, having a movable member containing a throat and expansion cone attached, for rotation, to a stationary member that is to be fixed to a rocket that generates high temperature, high pressure, erosive gases, the improvement comprising:

an annular, elastomeric pad bonded into an annular groove, of arcuate cross section, in a surface of the stationary member that is adjacent a surface of the movable member;

a torsion ring of arcuate cross section, having a radius shorter than that of the groove by the thickness of the elastomeric pad bonded to the elastomeric pad; and a lubricous bearing pad bonded to the torsion ring, so that it bears against the surface of the movable member.

2. The thrust nozzle of claim 1, wherein the lubricous pad comprises woven fibers of lubricous material and a lubricous resin filling the interstices thereof.

3. The thrust nozzle of claim 2 wherein the fibers are made of polytetrafluoroethylene and the resin filling the interstices thereof is a fluorinated, ethylenepropylene copolymer.

4. The thrust nozzle of claim 1, further including refractory fibers woven into the lubricous fibers on the side of the pad that is bonded to the torsion ring, to impart strength and enhance bonding characteristics of the pad.

5. The thrust nozzle of claim 4 wherein the refractory fibers are glass.

6. The thrust nozzle of claim 4 wherein the refractory fibers are carbon.

7. The thrust nozzle of claim 1 wherein the elastomer is a natural rubber.

8. The thrust nozzle of claim 7 wherein the elastomer is a cured mixture containing the following ingredients in approximate parts by weight:

| | |
|---|---|
| Raw latex | 100 |
| Carbon black | 30 |
| Zinc oxide | 5 |
| Sulfur | 0.6 |
| Zinc 2-Ethyl hexanoate | 2 |
| 2-Morpholinothio benzothiazole | 1.44 |
| Tetrabutylthiuram disulphide | 0.6 |
| Poly-2,2,4-trimethyl 1-1,2-dihydroquinoline | 2 |

* * * * *